US010721132B2

(12) United States Patent
Kurian

(10) Patent No.: US 10,721,132 B2
(45) Date of Patent: Jul. 21, 2020

(54) IOT CIRCUITRY MODULES

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 15/918,035

(22) Filed: Mar. 12, 2018

(65) Prior Publication Data

US 2019/0280936 A1   Sep. 12, 2019

(51) Int. Cl.
*G06F 15/173* (2006.01)
*H04L 12/24* (2006.01)
*H04L 12/26* (2006.01)
*H04L 29/12* (2006.01)

(52) U.S. Cl.
CPC .......... *H04L 41/12* (2013.01); *H04L 41/0659* (2013.01); *H04L 41/0672* (2013.01); *H04L 41/0816* (2013.01); *H04L 43/0817* (2013.01); *H04L 61/6022* (2013.01); *H04L 61/6054* (2013.01)

(58) Field of Classification Search
CPC . H04L 41/12; H04L 41/0659; H04L 41/0672; H04L 41/0816; H04L 41/0817; H04L 41/6022; H04L 41/6054
See application file for complete search history.

(56) References Cited

U.S. PATENT DOCUMENTS

| | | | |
|---|---|---|---|
| 9,319,404 B2 | 4/2016 | Svigals | |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |
| 9,699,814 B2 | 7/2017 | Zakaria et al. | |
| 9,716,595 B1 | 7/2017 | Kravitz et al. | |
| 9,729,528 B2 | 8/2017 | Zakaria et al. | |
| 9,825,921 B2 | 11/2017 | Reese | |
| 9,875,510 B1 | 1/2018 | Kasper | |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — SM A Rahman
(74) *Attorney, Agent, or Firm* — Weiss & Arons LLP; Michael A. Springs, Esq.

(57) ABSTRACT

Apparatus and methods for establishing an Internet of Things ("IoT") network. The IoT network may include a first IoT node and an IoT hub. The first IoT node may include a transmitter configured to transmit to the IoT hub a request to join the IoT network. The request may include a first Media Access Control address of the first IoT node and a first international mobile subscriber identity number of a SIM card included on the first IoT node. The IoT node may include a transmitter configured to transmit, to a second and a third node, a request requesting the second and third node to push a network processing function to the first IoT node. The request may be transmitted available CPU processing power of the first IoT node is determined to be below a threshold value for an interval of time.

17 Claims, 5 Drawing Sheets

(56) References Cited

U.S. PATENT DOCUMENTS

| | | | |
|---|---|---|---|
| 10,251,053 | B1 | 4/2019 | Paczkowski |
| 2016/0173495 | A1 | 6/2016 | Joo |
| 2016/0248746 | A1 | 8/2016 | James et al. |
| 2016/0259937 | A1 | 9/2016 | Ford et al. |
| 2016/0260095 | A1 | 9/2016 | Ford |
| 2016/0337127 | A1 | 11/2016 | Schultz et al. |
| 2016/0337322 | A1* | 11/2016 | Kang ............... H04L 63/08 |
| 2016/0366181 | A1 | 12/2016 | Smith et al. |
| 2017/0163444 | A1 | 6/2017 | McLaughlin et al. |
| 2017/0272342 | A1* | 9/2017 | Zessin ............... H04L 41/145 |
| 2017/0289184 | A1 | 10/2017 | C et al. |
| 2018/0054423 | A1* | 2/2018 | Liu ............... H04B 10/116 |
| 2018/0253451 | A1 | 9/2018 | Callan et al. |
| 2019/0172566 | A1 | 6/2019 | Schulman et al. |
| 2019/0289454 | A1 | 9/2019 | Inoue |
| 2019/0349190 | A1 | 11/2019 | Smith et al. |

OTHER PUBLICATIONS

"IOT Connectivity Simplified," https://neo.aeris.com/, Feb. 28, 2017.
"Global Hacker Botnet tops 6 million hijacked devices," http://www.computerweekly.com/news/450427023/Global-hacker-botnet-tops-6-million-hijacked-devices, Sep. 27, 2017.
"Subscriber Identity Module," https://en.wikipedia.org/wiki/Subscriber_identity_module, Feb. 27, 2018.
Conoscenti et al., "Peer to Peer for Privacy and Decentralized in the Internet of Things," 2017, IEEE, pp. 288-290. (Year: 2017).

* cited by examiner

IOT CIRCUITRY MODULES

FIELD OF TECHNOLOGY

Aspects of the disclosure relate to providing apparatus and methods for an IoT system. In particular, the disclosure relates to apparatus and methods for providing an IoT system that responds dynamically to system requirements.

BACKGROUND

An IoT system typically includes multiple Internet of Things ("IoT") nodes. Each of the IoT nodes perform one or more system functions. Sometimes, one or more IoT nodes may be underutilized in the system. For example, two or more IoT nodes may have available CPU processing power and/or available database storage that is underutilized for a period of time. This is undesirable at least because having extra IoT nodes on a system may result in a user paying additional maintenance fees, higher electricity bills, and unnecessary system exposure to attacks from a malicious device.

It would be desirable, therefore, to provide systems and methods for monitoring IoT nodes in an IoT system for optimization of IoT node resources.

SUMMARY OF THE DISCLOSURE

Systems and methods are provided for responding dynamically to requirements of an IoT system. The system may include a first IoT node, a second IoT node, a third IoT node and an IoT hub.

The first IoT node may include a processor configured to assess available CPU processing power of the first IoT node periodically upon the lapse of a first predetermined time interval. The processor may be further configured to determine whether or not the available CPU processing power is below a threshold value during a second predetermined time interval, the second interval being greater than the first interval.

When available CPU processing power on the first IoT node is below the threshold value for the second interval, the IoT node may include a transmitter configured to send a request to the second and third node. The request may request the first and second node to transmit to the first IoT node a network processing function.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
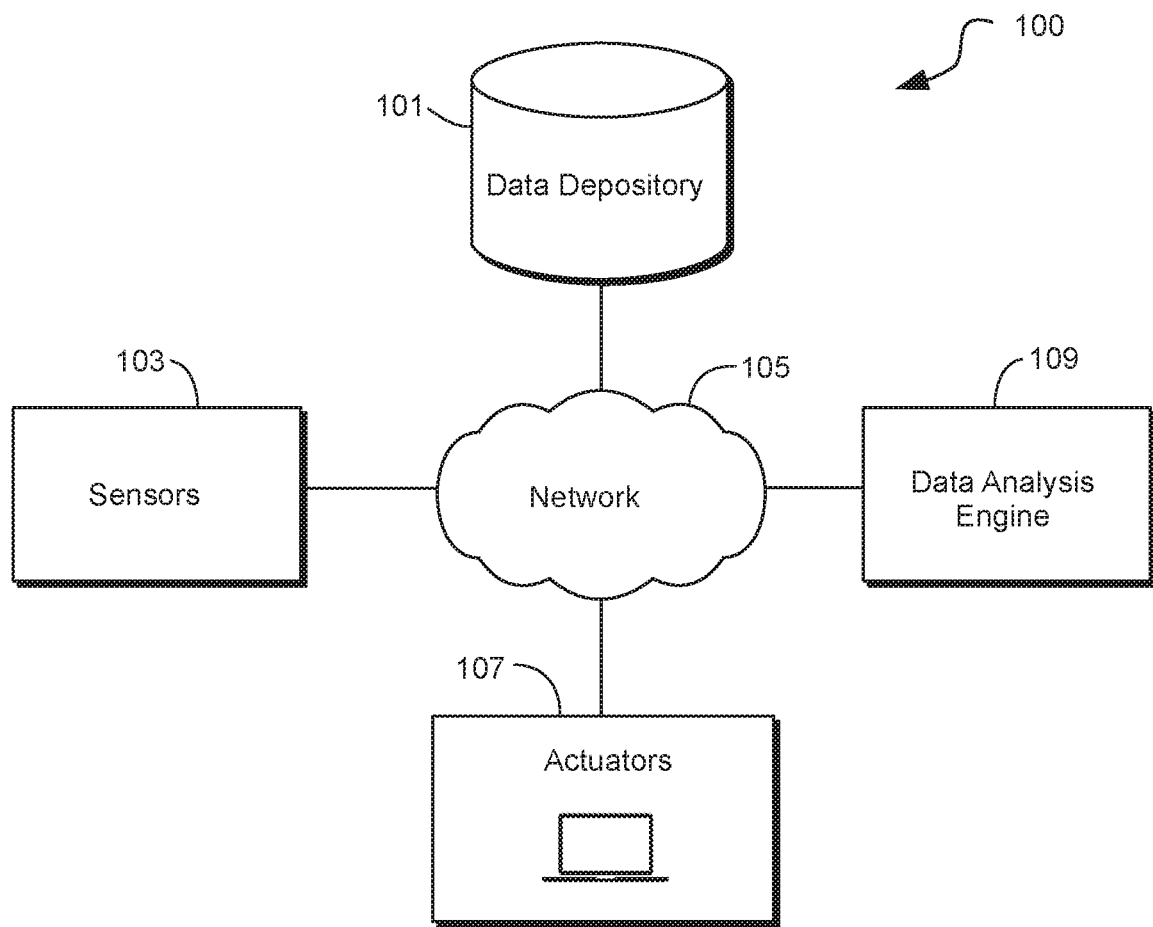
FIG. 1 shows an illustrative system in accordance with the invention.

Apparatus and methods for responding dynamically to requirements of an IoT system are provided. The apparatus and methods may be implemented on any suitable hardware device, such as a mobile phone, tablet, personal computer, television, server, watch, appliance, RFID tag, or any other hardware or software devices that supports a connection to one or more communication networks. The hardware device may be disposable. The hardware device may be reusable. The hardware device may be an IoT node. The hardware device may be an IoT hub.

The apparatus may include a first IoT node, a second IoT node, a third IoT node, and an IoT hub. The first, second and third IoT node, together with the IoT hub, may form an IoT network.

For the purposes of the application, apparatus and methods may be described in reference to a first IoT hub, however all functions and features of the first IoT hub may be included on the second IoT hub and the third IoT hub as well. Additionally, the IoT system may include two, three, four, five, six, ten, or any suitable number of IoT nodes. Each node in the IoT system may have one or more apparatus, or perform one or more methods, of the first, second and third IoT nodes described herein.

The first IoT node may be configured to respond dynamically to the requirements of the IoT network. The first IoT node may include a transmitter configured to transmit to the IoT hub a request to join the IoT network. The request may include a first Media Access Control ("MAC") address of the first IoT node and a first international mobile subscriber identity ("ISMI") number of a SIM card included on the first IoT node.

The first IoT node may include a receiver configured to receive authorization to join the IoT network. The receiver may also be configured to receive information identifying a second MAC address and a second ISMI number of a second SIM card included on the second IoT node and a third MAC address and a third ISMI number of a third SIM card included on the third IoT node.

The first IoT node may include a processor configured to assess available CPU processing power of the first IoT node periodically upon the lapse of a first predetermined time interval. For example, the processor may assess the available CPU processing power every 5 minutes, 10 minutes, 30 minutes, hour, or during the lapse of any other suitable predetermined time period.

In some embodiments, the first IoT node may also periodically assess other IoT node characteristics, such as available database storage space, frequency of incoming requests, remaining battery power, and any other suitable characteristics.

The processor may be further configured to determine whether or not the available CPU processing power is below a threshold value during a second predetermined time interval, the second interval being greater than the first interval. Exemplary second predetermined time intervals include 30 minutes, 1 hour, 3 hours, 12 hours, 1 day, 3 days, any other suitable time periods.

The transmitter of the first IoT node may be further configured to transmit a request to the second and third node. The request may be transmitted when the available CPU processing power is below the threshold value for the second interval. For example, if the processor assesses the available CPU processing power every 10 minutes (first predetermined time interval) and determines that the available CPU processing power is below the threshold value for 2 hours (second predetermine time interval), the transmitter may transmit the request. The request may request the second and third node to push a network processing function to the first IoT node. The request may include the first ISMI number and the first MAC address.

In the event that the first IoT node assesses one or more additional IoT node characteristics detailed above, the first IoT node may transmit the request in the event that values of additional characteristics are determined to be underneath or above threshold values for the respective characteristics during the second predetermined time interval or a different predetermined time interval. For example, if the processor determines that available database storage has been below a second threshold value for the second predetermined time interval, and the remaining battery power is above a third threshold value, the transmitter may transmit the request to the second and third node to push a network processing function to the first IoT node The receiver of the first IoT node may be further configured to receive a network processing function, a fourth ISMI number and a fourth MAC address. Exemplary network processing functions include receiving data from an IoT node that is not the second or third IoT node such as an RFID tag or sensor and transmitting the data to the IoT hub, processing data transmitted to the first IoT node, verifying security settings of data transmitted to the IoT node and then passing on verified data to the IoT hub, processing and/or further processing data received by the IoT hub prior to sending the data to the IoT hub, and any other suitable network processing functions.

The processor of the first IoT node may be further configured to determine whether or not both of the fourth ISMI number and the fourth MAC address matches both of an ISMI number and a MAC address associated with either the second IoT node or the third IoT node. When the fourth MAC address and the fourth ISMI number is found, by the processor, to match a MAC address and ISMI number of either the second or third node, the processor may be further configured to assume the network processing function. Assuming the network processing function may include saving all instructions relating to the network processing function in a first IoT node database and executing the instructions.

When the fourth MAC address and the fourth ISMI number is found not to match a MAC address and ISMI number of either the second or third node, the of the first IoT node transmitter may be further configured to purge the network processing function and all data, received by the receiver together with the network processing function. The transmitter may further transmit a warning message to the IoT hub, notifying the IoT hub of the mismatch. The warning message may notify the IoT hub that a potential bad actor is attempting to access the IoT network.

Thus, the MAC address and ISMI number may be used, by the first node, to determine whether or not data transmitted to the first IoT node is originating from an IoT node authorized into the IoT system by the IoT hub. In some embodiments, the first, second and third IoT nodes may append their respective MAC address and ISMI number to all IoT network communications transmitted between the nodes and the hub. All nodes, and the hub, may verify that incoming data is associated with a valid MAC address and ISMI number prior to processing the data. If incoming data is either not associated with a MAC address and ISMI number, or is associated with an invalid MAC address and ISMI number, the nodes and the hub may subsequently purge the incoming data.

Additionally, or alternatively, the first IOT node could be used as a checkpoint to scan the incoming messages or data for compromise. In the event that the first IoT node detects compromised data the first IoT node may re-route the message to a dump and/or review site. This may be instead of, or in addition to, using the IMSI number and MAC address to determine whether or not the transmitted message is originating from a node that has been authorized onto the IoT network. The second and third IoT nodes, and the hub, may perform the same functions.

The network processing function may include analyzing a dataset. The dataset may be received by the receiver from the second IoT node. The network processing function may include receiving data from a fourth IoT node and transmitting the data to the IoT hub.

The transmitter of the first IoT node may be further configured to transmit, to the central IoT hub, the assessed available CPU processing power after each periodic lapse of the predetermined time interval.

The receiver of the first IoT node may be further configured to receive, from the central IoT hub, a request to assume a network processing function.

The processor of the first IoT node may be further configured to reset one or more configuration settings of the first IoT node, or shut itself down, in response to a determination by the processor that a checksum associated with data input into, or generated by, the first IoT node is different than a baseline checksum value saved on the first IoT node.

The processor of the first IoT node may be further configured to reset one or more configuration settings of the first IoT node in response to a determination, by the processor, that one or more first IoT functions have failed to complete a task assigned to the first IoT node by the IoT hub.

The processor of the first IoT node may be further configured to shut down the first IoT node and restart the first IoT node in response to receipt of a request, from the second IoT node, the third IoT node, or the IoT hub, to shut down and restart. For example, in the event that the second IoT node, the third IoT node, or the IoT hub determines that the security settings of the first IoT hub have been compromised, the IoT hub or IoT node that detected the compromise may instruct the first IoT node to shut down.

The processor of the first IoT node may be further configured to detect a virus stored in a first IoT node database. The transmitter may be further configured to, in response to the detection, transmit a request to the IoT hub for a remediation algorithm for removing the virus from the first IoT hub. Upon receipt of the remediation algorithm by the receiver, the processor may be further configured to execute the remediation algorithm on the first IoT hub.

The receiver of the first IoT node may be further configured to receive a request, from the IoT hub, to shut down. The processor of the first IoT node may be further configured to shut down the IoT node in response to receipt of the request. In some embodiments, the request to shut down must originate from the IoT hub in order for the processor to responsively shut down the IoT node.

The receiver of the first IoT node may be further configured to receive, from the IoT hub, an instruction to shut down in response to the processor detecting one or more anomalous system conditions. The anomalous system conditions may be identified at least in part based on historical IoT node data stored in an IoT hub database. The processor of the first IoT node may be further configured to detect one of the one or more anomalous system conditions and, in response to the detection, shut down the first IoT node. The anomalous system conditions may be identified at least in part based on historical IoT node data stored in an first IoT node database.

Insertion of the first SIM card into the first IoT node may active the first IoT node. In some embodiments, the first SIM card may expire upon the lapse of a predetermined time period following the activation. In response to the expiry of the SIM card, the transmitter of the first IoT node may be further configured to transmit a message to the IoT hub informing the IoT hub of the expiry of the SIM card. The transmitter of the first IoT node may be further configured to transmit a request to the IoT hub to order a new SIM card for the first IoT node. Upon the expiry of the SIM card, the IoT hub may transmit an instruction to the second and third node to delete the first IMSI number and first MAC address from their databases.

In some embodiments, in response to the expiry of the SIM card, the processor of the first IoT node may be further configured to shut down the first IoT node. In some embodiments, the first IoT node may be shut down until the first IoT node receives an instruction, from the IoT hub, to restart. The IoT hub may transmit a restart command upon the insertion of a new SIM card into the first IoT node. After the new SIM card is inserted in the first IoT node, the first IoT node may transmit to the IoT hub the new IMSI number and request to be revalidated into the IoT system. The IoT hub may run validation checks on the first IoT node prior to reauthenticating the first IoT node to the IoT system. If the IoT hub determines that the first IoT node has been authenticated to join the IoT network, the IoT hub may transmit the new IMSI number, in addition to the MAC address of the first IoT node, to the other nodes on the IoT system.

In some embodiments, the first IoT node may remain shut down until the IoT hub transmits a reactivation code to the first IoT node. Receipt of the reactivation code may initiate the processor to restart the first IoT node. In some embodiments, receipt of the reactivation code may instruct the processor to restart the first IoT node for a predetermined length of time. In the event that a new SIM card is not inserted into the first IoT node upon the expiry of the predetermined length of time, the first IoT node may be instructed to shut down again.

In response to a request from the IoT hub, the first IoT node may accept a processing task previously assigned to the IoT hub.

The receiver of the first IoT node may be further configured to receive, from the IoT hub, an instruction instructing the first IoT node to receive and process data transmitted by a fourth IoT node. The receiver may also be configured to receive a data transmission identifying the fourth IoT node and a processing task to be executed on data received from the fourth IoT node. The first IoT node may include a database configured to store the processing task. The receiver of the first IoT node may be further configured to receive data from the fourth IoT node. The processor of the first IoT node may be further configured to process the data received form the fourth IoT node in accordance with the processing task received from the IoT hub.

The processor of the first IoT node may be further configured to execute a first set of processing tasks. The receiver of the first IoT node may be further configured to receive from the IoT hub a request to delete the first set of processing tasks and to store a second set of processing tasks. The processor of the first IoT node may be further configured to execute the second set of processing tasks.

The threshold value may be a first threshold value. The processor of the first IoT node may be further configured to determine whether or not available CPU processing power of the first IoT node is below a second threshold value for a third predetermined time interval, the third interval being greater than the second interval. The third predetermined time interval may be one day, three days, one week, two weeks, a month, or any other suitable predetermined time interval. In response to a determination that the CPU processing power is below the threshold value for the third predetermined time interval, the processor may be further configured to switch a state of the IoT node from an active state to a dormant state.

The receiver of the first IoT node may be further configured to receive a request, from the IoT hub, to switch from the dormant state to the active state. The processor of the IoT node may be further configured to switch the IoT node from the dormant state back to the active state.

The invention may include a method for assessing and distributing workflow within an IoT system including a first node, a second node, a third node and an IoT hub. The method may be performed by the IoT hub.

The method may include sending a request to each of the first, second and third node periodically upon a lapse of a time period, to transmit data to the IoT hub identifying available storage space and CPU processing power. The method may include receiving from the first, second and third node data identifying available storage space and CPU processing power. The method may include analyzing the received available storage space and available CPU processing power of the first, second and third node. The method may include, in response to a determination that the both the first and second nodes have available storage space above a first threshold value and available CPU processing power above a second threshold value, transmitting an instruction to the first node to delete itself from the IoT system and transmitting an instruction to the second node to assume one or more processing duties previously performed by the first node.

The IoT hub may perform IoT hub network tasks. Exemplary IoT hub network tasks may include receiving data, processing data, communicating one with IoT nodes, running security checks on IoT nodes, analyzing incoming data for viruses, and any other suitable IoT hub network tasks. The method may include requesting the first node to transmit data identifying first node network processing functions. The method may include instructing the first node to delete all the first node's network processing functions. The method may include transmitting to the first node the IoT hub network tasks. The method may include instructing the first node to assume the IoT hub network tasks. The method may include the IoT hub assuming the first node network processing functions.

The method may include requesting the first node to transmit data identifying first node network processing functions. The method may include requesting the second node to transmit data identifying second node network processing functions. The method may include instructing the first node to assume the second node network processing functions and to delete the first node network processing functions. The method may include instructing the second node to assume the first node network processing functions and to delete the second node network processing functions.

The method may include issuing a delete instruction to one or more of the first IoT node, the second IoT node and the third IoT node to prevent data leaks. A delete instruction may be issued in response to identifying that the one or more of the first IoT node, the second IoT node and the third IoT node have been compromised. A device may be compromised when it exhibits a malicious electronic communication pattern. The device may be compromised when a security breach or malicious electronic communication pattern is detected.

The method may also include issuing a command to the first IoT, the second IoT and the third IoT to change a communication language used for IoT network communications from a first communication language to a second communication language. Such a command may require each of the IoTs to use a new algorithm or scheme in IoT network communications, and may enhance network security by increasing the difficulty to interfere with network communications.

The method may further include generating a header to be used in all IoT network communications and transmitting the header to each of the IoT nodes. The header may be transmitted to the IoT nodes with an instruction to include the header in all IoT network communications, and to delete any incoming IoT network communications that do not include the header. The header may be included in IoT network communications by pre-pending the data/message with the header.

In some embodiments, the method may include transmitting additional instructions to the IoT nodes to be executed at runtime. The additional instructions may be transmitted together with the header. The instructions may specify data processing steps for executing during runtime. In these embodiments, multiple authenticated instructions may be used when preparing data for transmission on the IoT network that enhance the security of the IoT network. The IoT nodes may be further instructed to monitor all incoming data for compliance with the additional instructions, and if non-compliance is detected, delete the received data.

The invention may include a method for dynamically responding to the needs of an IoT network including a first node, a second node, a third node and an IoT hub. The method may be performed by the IoT first node. The method may include transmitting to the IoT hub a request to join the IoT network. The request may include a first Media Access Control ("MAC") address of the first IoT node and a first international mobile subscriber identity ("ISMI") number of a SIM card included on the first IoT node.

The method may include receiving authorization to join the IoT network. The method may include receiving information identifying a second MAC address and a second ISMI number of a second SIM card included on the second IoT node and a third MAC address and a third ISMI number of a third SIM card included on the third IoT node.

The method may include assessing available CPU processing power of the first IoT node periodically upon the lapse of a first predetermined time interval. The method may include determining whether or not the available CPU processing power is below a threshold value during a second predetermined time interval. The second interval may be greater than the first interval.

The method may include transmitting a request to the second and third node, when the available CPU processing power is below the threshold value for the second interval, to push a network processing function to the first IoT node, the request including the first ISMI number and the first MAC address.

The method may include receiving a network processing function, a fourth ISMI number and a fourth MAC address. The method may include determining whether or not both of the fourth ISMI number and the fourth MAC address matches both of an ISMI number and a MAC address associated with either the second IoT node or the third IoT node.

When the fourth MAC address and the fourth ISMI number is found, by the processor, to match a MAC address and ISMI number of either the second or third node, the method may include the first IoT node assuming the network processing function. When the fourth MAC address and the fourth ISMI number is found not to match a MAC address and ISMI number of either the second or third node, the method may include transmitting a warning message to the IoT hub, notifying the IoT hub of the receipt of data associated with the fourth ISMI number and the fourth MAC address, and purging the network processing function and all data received by the receiver together with the network processing function.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. Nodes 101, 103, 105, 107 and 109 may execute one or more of the functions of the first IoT node, the second IoT node, the third IoT node and/or the IoT hub described herein. The architecture includes sensors 103. Sensors 103 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to determine available bandwidth on a particular communication link. It may be difficult to determine which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Apparatus and methods provided herein may provide enhanced maintenance and supervision of IoT systems by assigning owners to different IoT systems and providing the ability to push updates from a central IoT hub to different groups of IoT nodes that may or may not support internet connection.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), Representational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
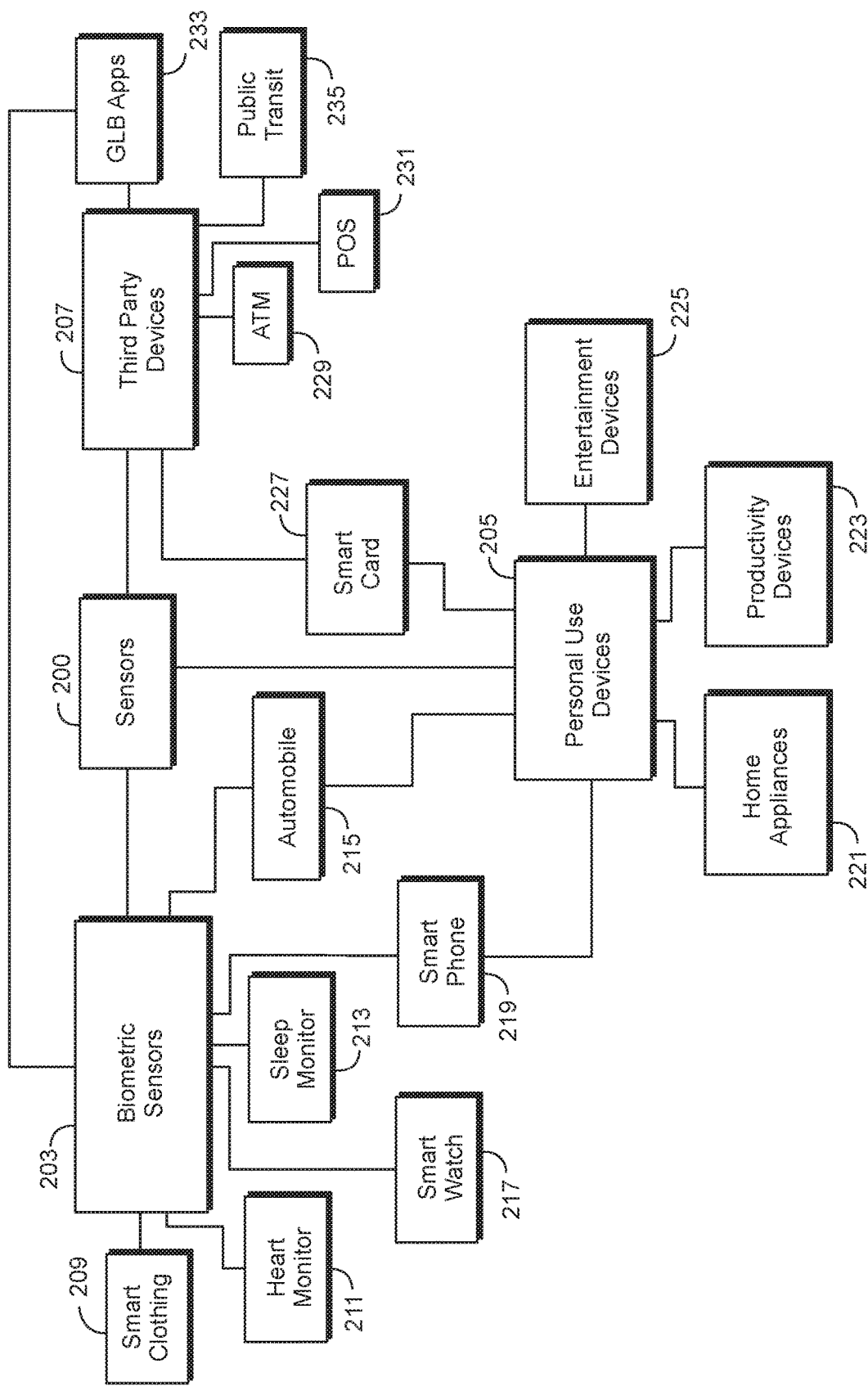
FIG. 2 shows an illustrative system in accordance with the invention.

FIG. 2 shows illustrative sensors 200. Sensors 200 may include or more features of sensors 103 (shown in FIG. 1). For the purposes of the application a sensor may be an IoT node. Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 200 shows that sensors may categorically overlap. For example, an application used to access an online bank portal may capture a biometric feature (e.g., fingerprint) to authenticate a user.

Each of the sensors shown in FIG. 200 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
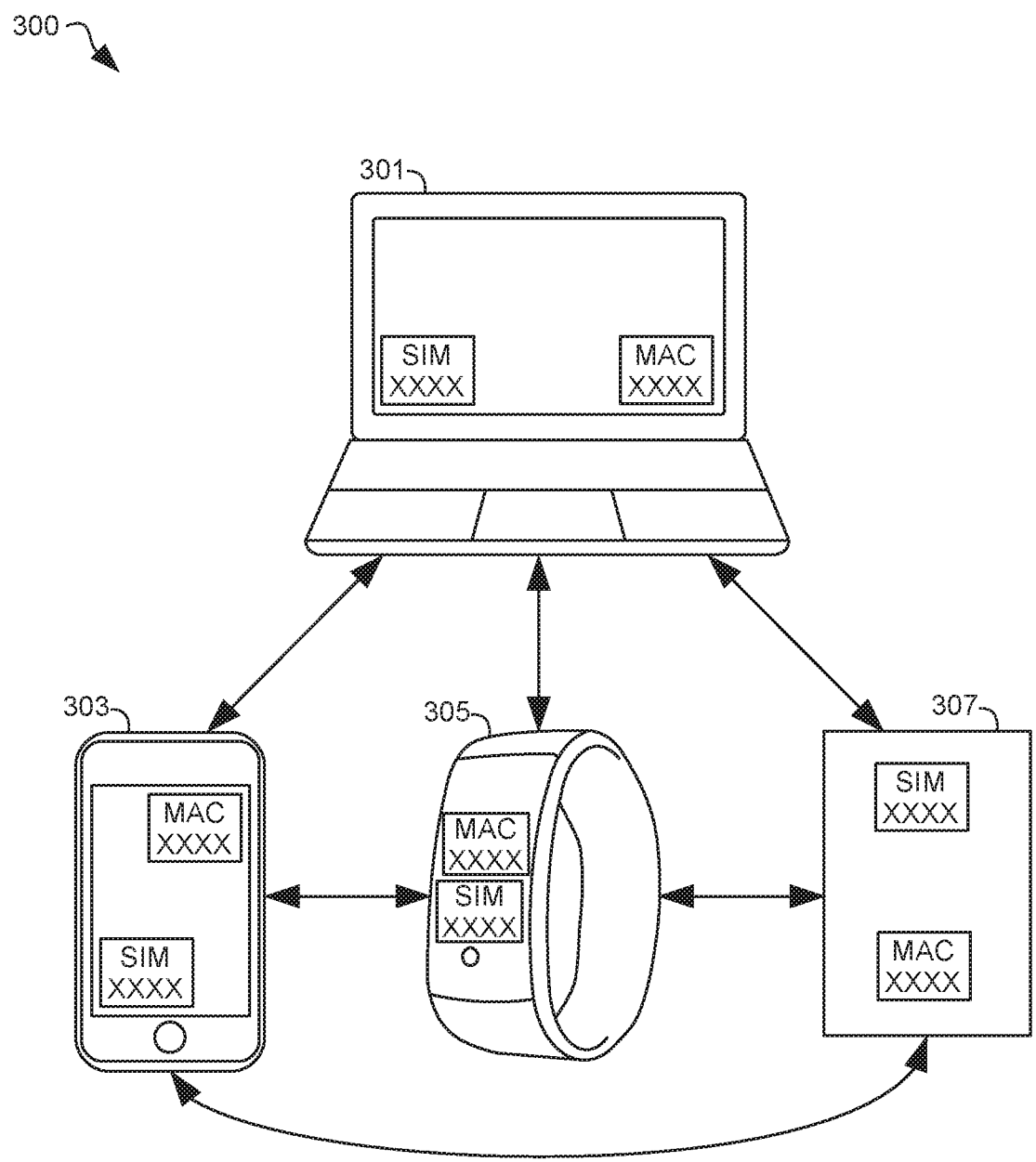
FIG. 3 shows an illustrative system in accordance with the invention.

FIG. 3 shows illustrative system 300 in accordance with the invention. Illustrative system 300 may include IoT hub 301, IoT node 303, IoT node 305 and IoT node 307. IoT hub 301 may be a computer. IoT node 303 may be a cellular phone. IoT node 305 may be a smart watch. IoT node 307 may be a sensor.

In system 300, IoT hub 301 and each of IoT nodes 303, 305 and 307 include a SIM card. Each SIM card may be associated with an IMSI. In system 300, IoT hub 301 and each of IoT nodes 303, 305 and 307 may each have a MAC address.

In FIG. 3, each device's SIM card and MAC address are illustrated on the device for illustrative purposes, although it is to be understood that both the SIM card and the MAC address of an IoT hub and/or an IoT node may not be shown on an exterior of the IoT hub and/or the IoT node.

IoT hub 301, and one or more of IoT nodes 303, 305 and 307 may be used to perform one or more system and methods described herein. Systems and methods in accordance with the invention may include one, two or more of nodes 303, 305, and/or 307.

Figure 4:
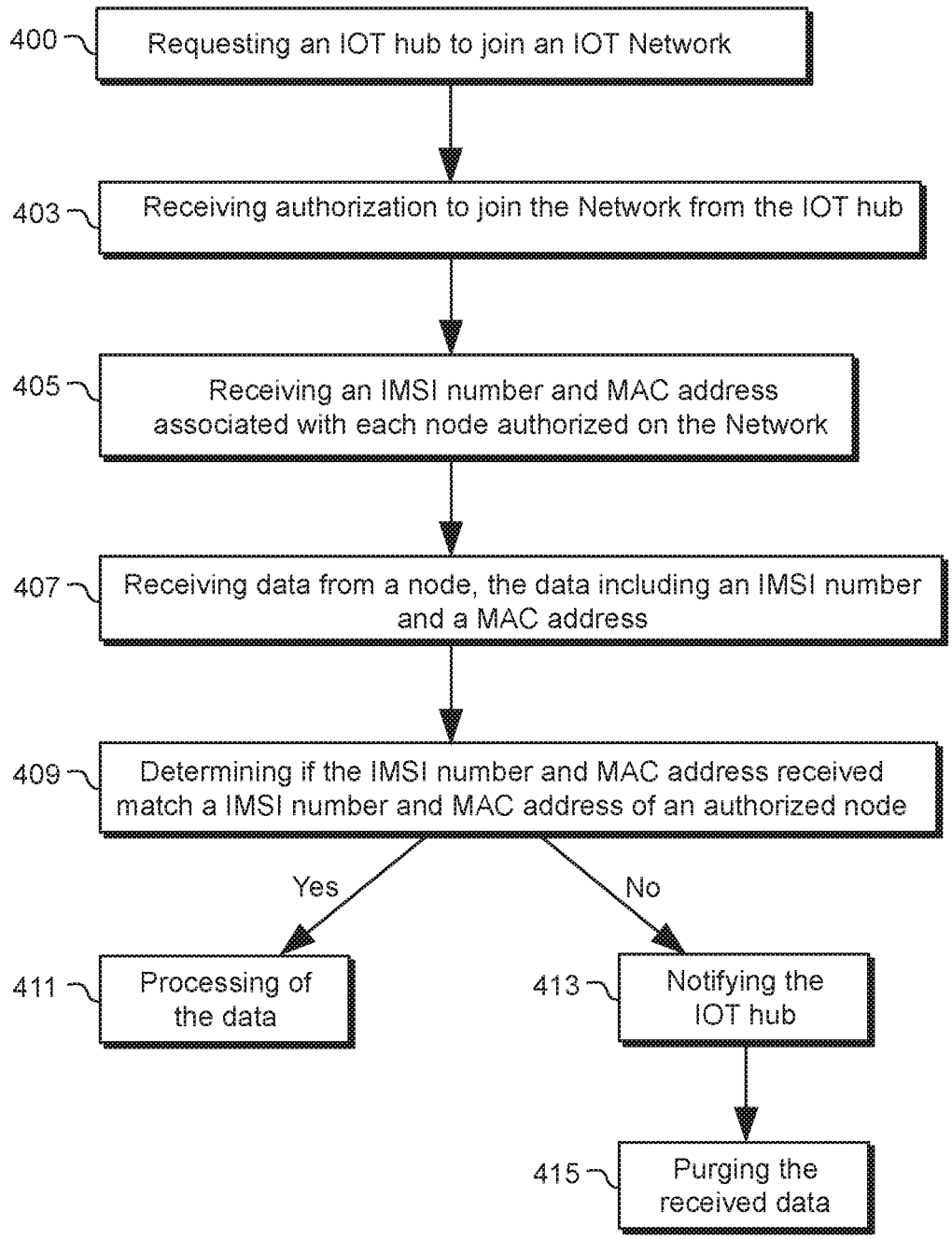
FIG. 4 shows an illustrative method in accordance with the invention.

FIG. 4 shows an illustrative method in accordance with the invention. The illustrative method may include one or more of steps 401-415, and any other methods steps described herein. Apparatus performing one or more of steps 401-415 may be an IoT node. An IoT node performing method steps 401-415 may be any illustrative IoT node described herein, such as nodes described in FIG. 1, 2 or 3.

At step 401, the method may include requesting an IoT hub to joint an IoT network. At step 403, the method may include receiving authorization to join the network. The authorization may be received from an IoT hub. At step 405, the method may include receiving an IMSI and MAC address associated with each IoT node authorized on the network. The IMSI and MAC data may be received from the IoT hub. At step 407, the method may include receiving data from a node. The data may include an IMSI number and a MAC address.

At step 409, the method may include determining if the received IMSI number and MAC address match data of an authenticated node.

At step 411, in the event that the received IMSI number and MAC address match an IMSI number and MAC address of an authorized node, the method may include processing the data. At step 413, in the event that the received IMSI number and MAC address do not match an IMSI number and Mac address of an authorized node, the method may include notifying the IoT hub. At step 415, the method may include purging the received data.

Figure 5:
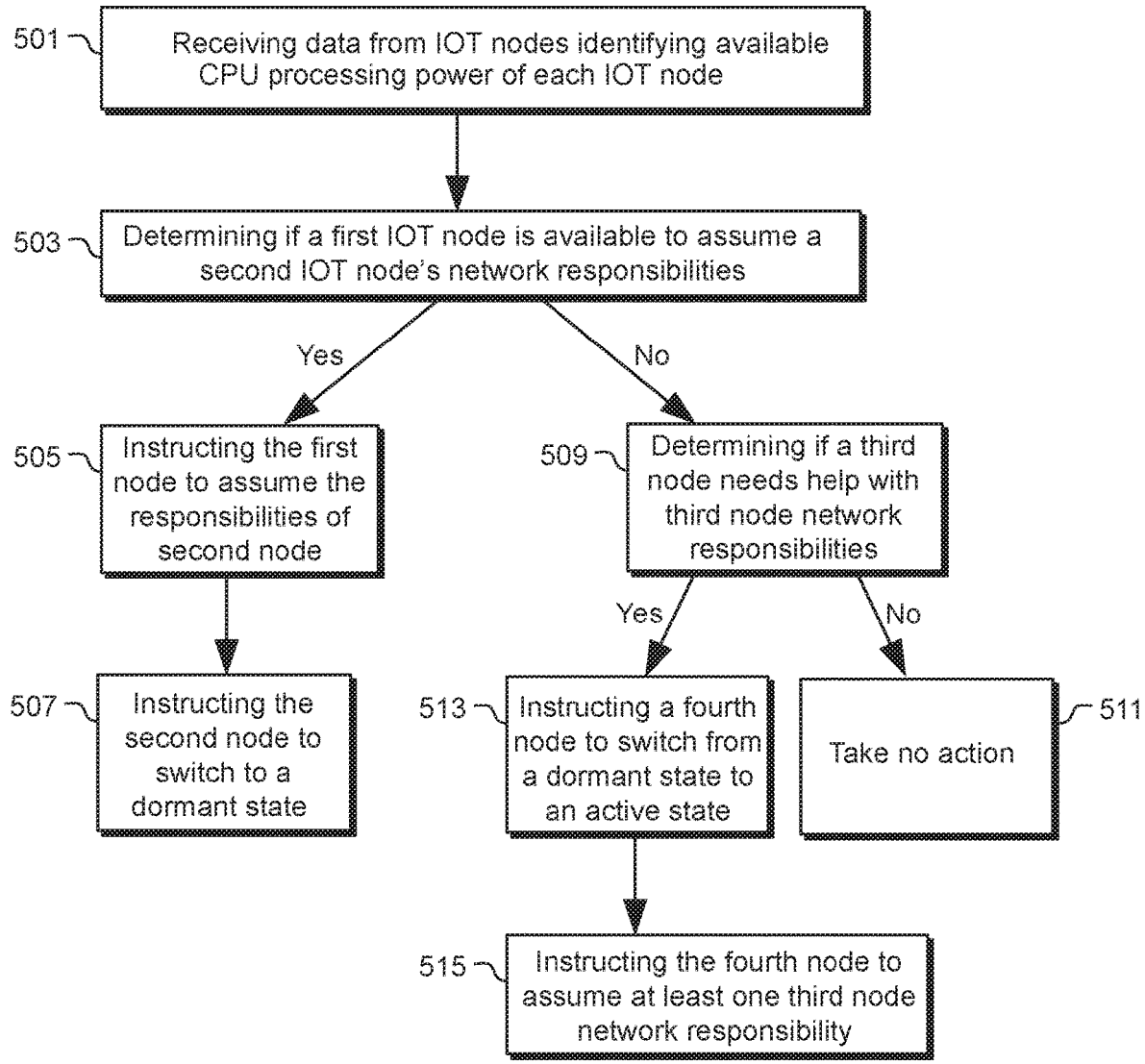
FIG. 5 shows an illustrative method in accordance with the invention.

FIG. 5 shows another illustrative method in accordance with the invention. The illustrative method may include one or more of steps 501-515, and any other methods steps described herein. Apparatus performing one or more of steps 501-515 may be an IoT hub. An IoT hub performing method steps 501-515 may be any illustrative IoT hub described herein, such as nodes described in FIG. 1, 2 or 3.

At step 501, the method may include receiving data from IoT nodes. The data received from each IoT node may identify available CPU processing power of the IoT node. At step 503, the method may include determining if a first IoT node is available to assume a second IoT node's network processing functions.

In the event that the first IoT node is determined to be available, the method may include, at step 505, instructing the first node to assume the responsibilities of the second node. The method may also include, at step 507, instructing the second node to switch to a dormant state.

In the event that the first IoT node is determined to not be available, the method may include, at step 509, determining if a third node needs help with a third node's network processing functions.

In the event that the third node is determined to need help, the method may include, at step 513, instructing a fourth node to switch from a dormant state to an active state. The method may also include, at step 515, instructing the fourth node to assume at least one third node network responsibility.

In the event that the third node is determined to not need help, the method may include, at step 511, taking no action.

Thus, systems and methods for responding dynamically to IoT network requirements have been provided. Persons skilled in the art will appreciate that the present invention can be practiced by other than the described embodiments, which are presented for purposes of illustration rather than of limitation.

What is claimed is:

1. A first Internet of Things ("IoT") node configured to respond dynamically to the requirements of an IoT network, the IoT network including the first IoT node, a second IoT node, a third IoT node and an IoT hub, the first IoT node comprising:
a transmitter configured to transmit to the IoT hub a request to join the IoT network, the request including a first Media Access Control ("MAC") address of the first IoT node and a first international mobile subscriber identity ("ISMI") number of a SIM card included on the first IoT node;
a receiver configured to receive authorization to join the IoT network and information identifying a second MAC address and a second ISMI number of a second SIM card included on the second IoT node and a third MAC address and a third ISMI number of a third SIM card included on the third IoT node;
a processor configured to:
assess available CPU processing power of the first IoT node periodically upon the lapse of a first predetermined time interval; and
determine whether or not the available CPU processing power is below a threshold value during a second predetermined time interval, the second interval being greater than the first interval;
the transmitter being further configured to transmit a request to the second IoT node and the third IoT node, when the available CPU processing power is below the threshold value for the second interval, to push a network processing function to the first IoT node, the request including the first ISMI number and the first MAC address;
the receiver being further configured to receive a network processing function, a fourth ISMI number and a fourth MAC address;
the processor being further configured to determine whether or not both of the fourth ISMI number and the fourth MAC address matches both of an ISMI number and a MAC address associated with either the second IoT node or the third IoT node;
when the fourth MAC address and the fourth ISMI number is found, by the processor, to match a MAC address and ISMI number of either the second IoT node or the third IoT node, the processor being further configured to assume the network processing function;
when the fourth MAC address and the fourth ISMI number is found not to match a MAC address and ISMI number of either the second IoT node or the third IoT node, the transmitter being further configured to:
transmit a warning message to the IoT hub, notifying the IoT hub of the receipt of data associated with the fourth ISMI number and the fourth MAC address; and
purge the network processing function and all data received by the receiver together with the network processing function; and
the processor, in response to a request from the IoT hub, being further configured to accept a processing task previously assigned to the IoT hub.

2. The first IoT node of claim 1 wherein the network processing function includes analyzing a dataset, the dataset being transmitted to the receiver from the second IoT node.

3. The first IoT node of claim 1 wherein the network processing function includes receiving data from a fourth IoT node and transmitting the data to the IoT hub.

4. The first IoT node of claim 1 wherein the transmitter is further configured to transmit, to the IoT hub, the assessed available CPU processing power after each periodic lapse of the predetermined time interval.

5. The first IoT node of claim 4 wherein the receiver is further configured to receive, from the IoT hub, a request to assume a network processing function.

6. The first IoT node of claim 1 wherein the processor is further configured to reset one or more configuration settings of the first IoT node in response to a determination, by the processor, that a checksum associated with data input into the first IoT node is different than a baseline checksum value saved on the first IoT node.

7. The first IoT node of claim 1 wherein the processor is further configured to restart the first IoT node in response to receipt of a request from the second IoT node, the third IoT node, or the IoT hub.

8. The first IoT node of claim 1 wherein:
the processor is further configured to detect a virus stored in a first IoT node database; and, in response to the detection,
the transmitter is further configured to transit a request to the IoT hub for a remediation algorithm.

9. The first IoT node of claim 1 wherein:
the receiver is further configured to receive a request, from the IoT hub, to shut down; and
the processor is further configured to shut down the first IoT node in response to receipt of the request.

10. The first IoT node of claim 1 wherein:
the receiver is further configured to receive, from the IoT hub, an instruction to shut down in response to the processor detecting one or more anomalous system conditions; and
the processor is further configured to detect one of the one or more anomalous system conditions and, in response to the detection, shut down the first IoT node.

11. The first IoT node of claim 1 wherein insertion of the first SIM card into the first IoT node actives the first IoT node.

12. The first IoT node of claim 11 wherein:
the first SIM card expires upon the lapse of a predetermined time period following the activation; and
in response to the expiry of the SIM card:
the transmitter being further configured to transmit a message to the IoT hub informing the IoT hub of the expiry; and
the processor being further configured to shut down the first IoT node.

13. The first IoT node of claim 1 further comprising:
the receiver being further configured to receive, from the IoT hub:
an instruction instructing the first IoT node to receive and process data transmitted by a fourth IoT node;
a data transmission identifying a fourth IoT node; and
a processing task to be executed using data received from the fourth IoT node;
a database configured to store the processing task;
the receiver being further configured to receive data from the fourth IoT node; and
the processor being further configured to process the data received form the fourth IoT node in accordance with the processing task received from the IoT hub.

14. The first IoT node of claim 1 wherein:
the processor is further configured to execute a first set of processing tasks;
the receiver is further configured to receive from the IoT hub:
a request to delete the first set of processing tasks; and
a second set of processing tasks; and
the processor is further configured to execute the second set of processing tasks.

15. The first IoT node of claim 1 when the threshold value is a first threshold value wherein the processor is further configured to:
determine whether or not available CPU processing power of the first IoT node is below a second threshold value for a third predetermined time interval, the third interval being greater than the second interval; and
in response to a determination that the CPU processing power is below the second threshold value for the third predetermined time interval, switching a state of the first IoT node from an active state to a dormant state.

16. The first IoT node of claim 15 wherein:
the receiver is further configured to receive a request, from the IoT hub, to switch from the dormant state to the active; and
the processor is further configured to switch the first IoT node from the dormant state to the active state.

17. A method for dynamically responding to the needs of an Internet of Things ("IoT") network including a first IoT node, a second IoT node, a third IoT node and an IoT hub, the method being performed by the first IoT node, the method comprising:
transmitting to the IoT hub a request to join the IoT network, the request including a first Media Access Control ("MAC") address of the first IoT node and a first international mobile subscriber identity ("ISMI") number of a SIM card included on the first IoT node;
receiving authorization to join the IoT network and information identifying a second MAC address and a second ISMI number of a second SIM card included on the second IoT node and a third MAC address and a third ISMI number of a third SIM card included on the third IoT node;
assessing available CPU processing power of the first IoT node periodically upon the lapse of a first predetermined time interval;
determining whether or not the available CPU processing power is below a threshold value during a second predetermined time interval, the second interval being greater than the first interval;
transmitting a request to the second IoT node and the third IoT node, when the available CPU processing power is below the threshold value for the second interval, to push a network processing function to the first IoT node, the request including the first ISMI number and the first MAC address;
receiving a network processing function, a fourth ISMI number and a fourth MAC address;
determining whether or not both of the fourth ISMI number and the fourth MAC address matches both of an ISMI number and a MAC address associated with either the second IoT node or the third IoT node;
when the fourth MAC address and the fourth ISMI number is found, by the processor, to match a MAC address and ISMI number of either the second or third node, assuming the network processing function;
when the fourth MAC address and the fourth ISMI number is found not to match a MAC address and ISMI number of either the second IoT node or the third IoT node:
transmitting a warning message to the IoT hub, notifying the IoT hub of the receipt of data associated with the fourth ISMI number and the fourth MAC address; and
purging the network processing function and all data received by the receiver together with the network processing function; and
in response to a request from the IoT hub, accepting a processing task previously assigned to the IoT hub.

* * * * *